United States Patent [19]

Wood

[11] Patent Number: 4,821,244

[45] Date of Patent: Apr. 11, 1989

[54] TUBULAR ACOUSTIC PROJECTOR

[75] Inventor: Frank Wood, Hornsea, United Kingdom

[73] Assignee: Ferranti International Signal, plc, Cheshire, England

[21] Appl. No.: 94,723

[22] PCT Filed: Dec. 1, 1986

[86] PCT No.: PCT/GB86/00729

§ 371 Date: Jul. 21, 1987

§ 102(e) Date: Jul. 21, 1987

[87] PCT Pub. No.: WO87/03448

PCT Pub. Date: Jun. 4, 1987

[30] Foreign Application Priority Data

Nov. 30, 1985 [GB] United Kingdom ................. 8529543

[51] Int. Cl.[4] ............................................. H04B 13/00

[52] U.S. Cl. .................................... 367/159; 367/165; 367/167; 367/172; 310/337

[58] Field of Search ............... 367/157, 159, 165, 166, 367/167, 171, 172, 173; 310/337, 334

[56] References Cited

U.S. PATENT DOCUMENTS

| | | | |
|---|---|---|---|
| 3,043,967 | 7/1962 | Clearwaters | 310/334 |
| 3,317,762 | 5/1967 | Corwin et al. | 310/334 |
| 3,539,980 | 11/1970 | Massa . | |
| 3,651,353 | 3/1972 | Hugli et al. | 310/334 |
| 3,706,967 | 12/1972 | Renna, Jr. . | |
| 3,716,828 | 2/1973 | Massa . | |
| 3,846,744 | 11/1974 | Renna, Jr. et al. . | |
| 4,545,041 | 10/1985 | Tims et al. . | |

*Primary Examiner*—Deborah L. Kyle
*Assistant Examiner*—John W. Eldred
*Attorney, Agent, or Firm*—Dennis P. Clarke

[57] ABSTRACT

A tubular acoustic projector for underwater use consists of a ceramic, piezo-electric transducer (21A, 21B) contained in a coaxial, electrically-conductive cylindrical housing (10) whose side wall (11) is thin enough to vibrate with the transducers (21A, 21B). The side wall (11) maintains the transducer under a radial compressive pre-load so as to avoid ceramic failure due to tensile stress. The side wall is sufficiently thermally conductive to dissipate the heat generated in the transducer, in use, to prevent failure of the transducer under the effects of heat. Electrical isolation of the inner and outer surfaces of the transducer is achieved by filling the housing with an insulating liquid.

14 Claims, 2 Drawing Sheets

TUBULAR ACOUSTIC PROJECTOR

The present invention relates to tubular acoustic projectors for use underwater.

A known tubular acoustic projector comprises a tubular ceramic piezo-electric transducer whose inner and outer cylindrical surfaces are electroded to convey a high differential drive voltage to the transducer. Electrical insulation is generally provided over the outer surface of the transducer to ensure that the two surfaces are isolated when submerged in water. The power handling capability of such transducers is limited by the ability of the ceramic material to withstand tensile stress, and by the ability of the projector to dissipate the heat generated by the transducer which is a large proportion of the input energy. Failure to dissipate heat causes high temperatures which result in changes in the electrical, and ultimately mechanical, properties of the transducer, and which can also cause cavitation of the surrounding water.

It is known to delay the onset of ceramic failure through tensile stress by applying a band or winding, e.g. of fibreglass, in tension around the circumference of the transducer. However, the presence of such a band or winding introduces thermal insulation and thus aggravates the problem of heat dissipation, which is already severe since the electrical insulation itself has a heat insulating effect.

According to the invention, there is provided a tubular acoustic projector for underwater use, comprising a tubular piezo-electric transducer having an outer cylindrical surface, and a housing including a side wall having a cylindrical inner surface which contacts said outer cylindrical surface of the transducer, said side wall compressing radially said transducer and, in operation, transmitting vibrations of the transducer to surrounding water, and the side wall being so thermally conductive as to dissipate to the surrounding water heat generated by the transducer.

The housing with the thermally conductive side wall thus removes heat from the transducer while radially compressing the transducer. This thus delays the onset of failure in a ceramic transducer without affecting adversely the electrical and mechanical properties of the transducer. This allows the transducer to be operated at higher powers than the transducers of known projectors.

The thickness of the housing provides an outer surface area for the projector which is greater than the outer surface area of the transducer, which has the beneficial effect of reducing the power output per unit area to the surrounding water, thus reducing the tendency to cause cavitation of the water.

Preferably said side wall of the housing is formed of a metal material. The side wall may have cylindrical inner and outer surfaces.

One terminal of said transducer is preferably provided on said outer surface of said transducer, the side wall of the housing being of a metal material and being in electrical contact with said terminal to provide an earth of the transducer.

The terminal may be provided by a metallic coating on said outer surface, said metal side wall being in direct contact with said coating.

The side wall is preferably of such an axial length as to extend beyond said transducer at both ends thereof.

The housing may be open ended, in which case the projector is provided with means for electrically isolating the inner surface of the transducer from its outer surface.

Alternatively, the side wall may terminate in open ends, with the housing including end closures which close said open ends to provide a sealed container for the transducer.

In this case, the interior of the housing is preferably filled with an electrically insulating liquid for insulating electrically the inner and outer surfaces of the transducer. One of said end closures may be provided with one or more closable apertures for the filling of the housing with said electrically insulating liquid.

The housing may contain a device for balancing the pressure in said electrically insulating liquid with the pressure in water around the projector. This device may include a balancing diaphragm.

Preferably at least one of the end closures has, near the periphery thereof, a cylindrical groove which is wider in the radial direction than the radial thickness of the side wall, and which receives the corresponding end of the side wall. In order to ensure that there is an effective seal maintained between the side wall and the end closure, there is preferably a tight fit between the open end of the side wall and a radially inner cylindrical side of the groove, and the remainder of the groove is filled with a flexible sealant. The end of the side wall is thus able to vibrate radially, substantially unconstrained by the end closure.

The invention further provides a method of manufacture of a tubular acoustic projector for underwater use, comprising: forming a tubular piezo-electric transducer with an outer cylindrical surface, and then heat-shrinking onto said cylindrical surface, a cylindrical inner surface of a side wall of a housing so that said side wall compresses radially the transducer and, in operation, will transmit vibrations of the transducer and, in operation, will transmit vibrations of the transducer to the surrounding water, said side wall being so thermally conductive as to dissipate to the surrounding water heat generated by the transducer during operation.

In order that the invention may be better understood, a preferred embodiment will now be described, by way of example only, with reference to the accompanying drawings, wherein.

Figure 1:
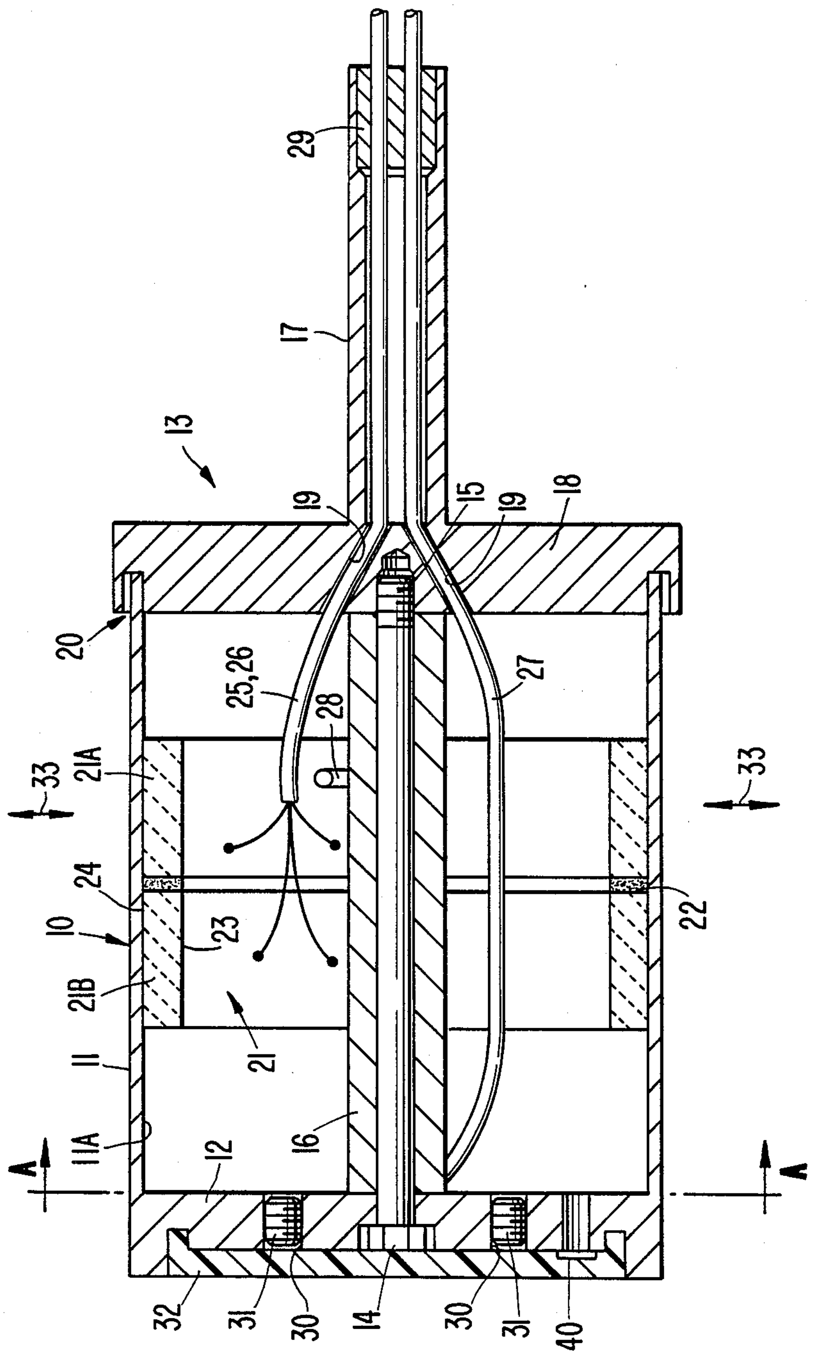
FIG. 1 is a section through the axis of a tubular acoustic projector embodying the invention.

As shown in FIG. 1, the tubular acoustic projector comprises a housing 10, having a cylindrical side wall 11 formed with a cylindrical inner surface 11a. The side wall 11 is integral with, and substantially thinner than, an end wall 12, which closes one end of the housing 10. The other end of the housing 10 is closed by a removable end closure 13, similar in thickness to the end wall 12. The end closure 13 is secured in position by a bolt 14 which passes through a bore in the centre of the end wall 12, through a tubular spacer 16 extending coaxially between the end wall 12 and the end closure 13, and into screw-threaded engagement with a threaded bore 15 in the centre of the end closure 13.

Figure 3:
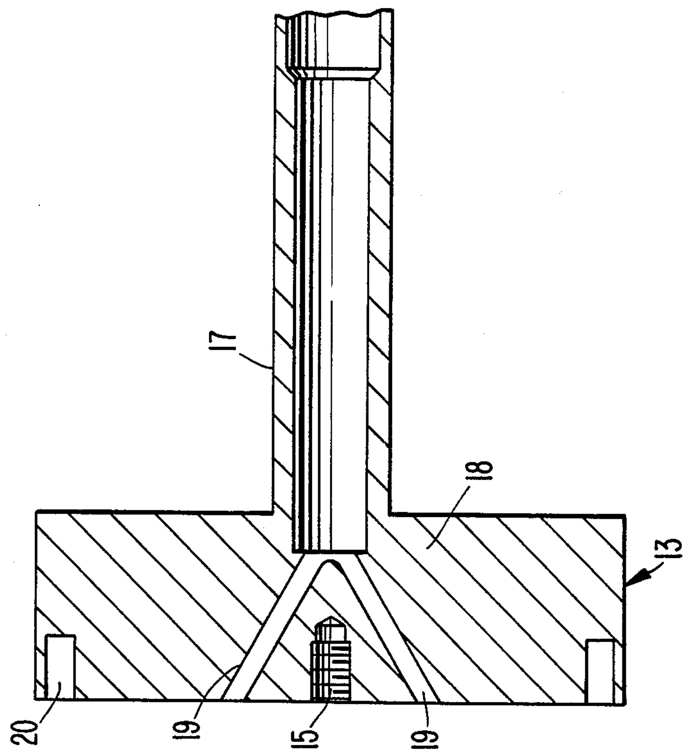
FIG. 3 is an axial section through an end cap of the projector of FIGS. 1 and 2.

The end closure 13 (as best seen in FIG. 3) consists of a tube 17 open at one end and at an opposite end integrally connected to the centre of a disk-like plate 18. The plate 18 has four bores 19 which lead from the hollow interior of the tube 17 to an inner face of the plate within the housing 10, as shown most clearly in FIGS. 2 and 3. These bores 19 are to receive respective cables, as described below. The plate 18 also has a cylindrical groove 20 cut into the inner face, near the periphery thereof. The end of the side wall 11 is received in this groove 20 with a flexible sealant 20A, and the arrangement is such that an end portion of the side wall 11 engages tightly an axially extending inner cylindrical wall of the groove 20, at least when the transducer is not being driven.

The housing is of a strong, thermally and electrically conductive, non-corrodable metal such as stainless steel, although aluminium could be used.

A tubular transducer 21, formed by two identical, coaxial tubular, ceramic, piezo-electric transducer elements 21A,21B, joined by an adhesive 22 at adjacent end faces, is disposed within the housing 10. The tubular transducer 21 has cylindrical inner and outer surfaces 23,24 which are silvered for a purpose to be described below. The inner silvered surface 23 of each transducer element 21A,21B has connected thereto a respective ring of narrow diameter wire (not shown) also for a purpose to be described below. The side wall 11 of the housing 10, which is electrically conductive, engages the silvered outer cylindrical surface 24 of transducer 21 and provides an electrical earth connection therefor. The side wall 11 is such as to maintain the transducer 21 under radial compression, providing a compressive pre-load sufficient to avoid ceramic failure due to tensile stress induced, in use, in the transducer 21.

The ceramic transducer may be of PZT (lead zirconate titanate) or of a similar suitable ceramic material.

Figure 2:
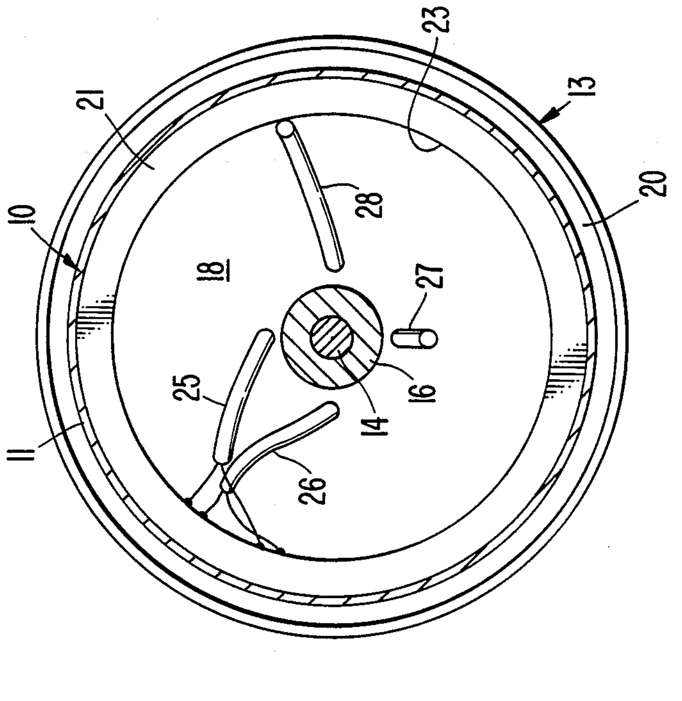
FIG. 2 is a section on the line A—A of FIG. 1.

The electrical drive for the transducer 21 is provided as follows. Four insulated leads (25,26,27,28) are threaded through an end seal 29, passed into the open end of the tube 17, and then passed through respective bores 19, in the plate 18. The end seal 29 seals the open end of the tube 17. As shown in FIGS. 1 and 2, leads 27 and 28 provide an earth connection and are connected respectively to the end wall 12 and side wall 11 of the housing 10. The leads 25 and 26 carry a high A.C. voltage drive signal, and two conductors within each cable are soldered respectively on to the terminals of the inner surfaces 23 of the transducer elements 21A,21B. These terminals are formed by the wire rings which, together with the silvered surfaces, distribute the drive signal evenly over the inner surfaces of the transducer elements.

The housing 10 is filled with an insulating liquid such as castor oil or transformer oil, which has good electrical insulation properties and good heat transfer properties through convection and conduction. Two holes 30 are provided through the end wall 12 of the housing 10 to allow the filling of the housing 10 with the liquid, and the holes 30 are sealed by grub screws 31. These screws 31, and the head of the bolt 14, are covered by a polyurethane seal 32, set into a circular recess in the end wall 12.

A diaphragm 40 (shown in simplified from in FIG. 1) may be provided in the housing, preferably in either the end closure 13 or the end wall 12, to equalize the pressure inside and outside the projector. The diaphragm may, for example, be a metal bellows.

The projector may be manufactured by heat-shrinking the side wall 11 over the transducer elements 21A,21B, then securing the end closure 13 to the side wall 11, and finally filling the housing with the liquid and adding the seal 32.

The projector functions as follows. A differential A.C. voltage applied across the tubular transducer 21 by the leads 25,26,27,28 causes it to vibrate radially, causing the side wall 11 of the housing to vibrate as shown by the arrows 33 in FIG. 1. Acoustic vibrations are thus emitted by the side wall 11 of the housing.

It will be appreciated that in the projector described above with reference to the drawings, the transducer 21 is held under radial compression by the side wall 11, so reducing the tendency of the transducer 21 to crack under tensile stresses induced in the transducer 21 in operation. Further, the side wall 11, being thermally conductive and having a heat-dissipating surface area which is greater than the surface area of the transducer 21, dissipates to the surrounding water, the heat generated in the transducer 21 during operation. This reduces the tendency of the transducer 21 to fail as a result of high temperature induced changes in the mechanical or electrical properties of the transducer 21, and also reduces the likelihood of cavitation in the surrounding water. Further, the side wall 11 provides an electrical earth for the transducer 21, so simplifying the electrical connections within the housing 10. Since the side wall 11 is of metal, it is not degraded at high operating temperature.

The projector described above with reference to the drawings is thus capable of achieving high consistency of performance in production since the pre-load and the thermal properties are defined by the design of the parts of the projector and are only minimally dependent on the production process used.

Although the example illustrated has four cables 25–28, there is no need for any more than two electrical leads: an earth lead, connected to the side wall 11 and/or the end wall 12 of the housing 10, and a lead conveying the A.C. drive signal to the inner surface or surfaces of the transducer 21.

It will be appreciated that the transducer 21 need not be formed of two transducer elements 21A,21B; it could be formed of a single tubular element or of three or more tubular elements. The tubular elements or elements may have any required axial length.

While the embodiment described above with reference to the drawings has the earth connection made by the side wall 11, the earth connection could be made direct to the transducer. Further, although the sidewall has been described as of metal, it could be made of any suitable material able to dissipate sufficient heat.

Further, in the embodiment described above with reference to the drawings, the side wall 11 of the housing is substantially thinner than the end wall 12 and the disk 18. This is not essential; indeed, it has been discovered that the side wall 11 may advantageously be as thick or thicker than the end wall 12 and/or the disk 18, thus increasing still further the heat-emitting outer surface area of the projector, and thereby improving heat dissipation. Acoustic isolation of the side wall 11 from the end wall 12 could then be achieved by narrowing an annular end portion of the side wall 11 adjacent the end wall 12, forming a thin, flexible neck portion linking the side wall 11 and the end wall 12.

I claim:

1. A tubular acoustic projector for underwater use comprising a tubular ceramic piezoelectric transducer having an outer cylindrical surface and a housing containing the transducer and interfacing with surrounding water, said housing including a side wall supporting the transducer in the housing by radially compressive engagement of an inner cylindrical surface of the side wall on the outer cylindrical surface of the transducer, said side wall being longer that the transducer and operable in operation to transmit vibrations of the transducer to the surrounding water and conduct heat generated by the transducer to the surrounding water across the interface between the housing and surrounding water.

2. A tubular acoustic projector according to claim 1, in which the side wall (11) of the housing (10) is formed of a metal material.

3. An acoustic projector according to claim 1, in which the housing (10) is open ended, and the projector is provided with means for electrically isolating the inner surface (23) of the transducer (21) from its outer surface (24).

4. An acoustic projector according to claim 1, in which the side wall (11) of the housing (10) terminates in open ends, and the housing has end closures (12,13) which close said open ends to provide a sealed container for the transducer.

5. A tubular acoustic projector according to claim 2, in which the side wall of the housing is formed of a metal material heat shrunk onto the transducer.

6. A tubular acoustic projector for underwater use, comprising a tubular ceramic piezo-electric transducer (21) having an outer cylindrical surface (24), and means surrounding the outer cylindrical surface of the transducer and compressing radially said transducer, characterized in that said compressing means is provided by a housing (10) including a side wall (11) having a cylindrical inner surface (11A) which contacts said outer cylindrical surface (24) of the transducer (21), said side wall (11) compressing radially said transducer and, in operation, transmitting vibrations of the transducer to surrounding water, and the side wall (11) being so thermally conductive as to dissipate to the surrounding water heat generated by the transducer and in which the side wall (11) of the housing is formed of a metal material and in which a terminal of the transducer (21) is provided on its outer cylindrical surface (24), and the metal side wall (11) of the housing (10) is an electric contact with said terminal to provide an earth of the transducer.

7. An acoustic projector according to claim 6, in which the terminal is formed by a metallic coating on the outer cylindrical surface (24) of the transducer (21), and the metal side wall (11) is in direct contact with said coating.

8. A tubular acoustic projector for underwater use, comprising a tubular ceramic piezo-electric transducer (21) having an outer cylindrical surface (24), and means surrounding the outer cylindrical surface of the transducer and compressing radially said transducer, characterized in that said compressing means is provided by a housing (10) including a side wall (11) having a cylindrical inner surface (11A) which contacts said outer cylindrical surface (24) of the transducer (21), said side wall (11) compressing radially said transducer and, in operation, transmitting vibrations of the transducer to surrounding water, and the side wall (11) being so thermally conductive as to dissipate to the surrounding water heat generated by the transducer and, in which the side wall (11) of the housing (10) terminates in open ends, and the housing has end closures (12,13) which close said open ends to provide a sealed container for the transducer and in which the housing (10) is filled with an electrically insulating liquid for insulating electrically the inner and outer surfaces (23,24) of the transducer.

9. A tubular acoustic projector for underwater use, comprising a tubular ceramic piezo-electric transducer (21) having an outer cylindrical surface (24), and means surrounding the outer cylindrical surface of the transducer and compressing radially said transducer, characterized in that said compressing means is provided by a housing (10) including a side wall (11) having a cylindrical inner surface (11A) which contacts said outer cylindrical surface (24) of the transducer (21), said side wall (11) compressing radially said transducer and, in operation, transmitting vibrations of the transducer to surrounding water, and the side wall (11) being so thermally conductive as to dissipate to the surrounding water heat generated by the transducer and, in which the side wall (11) of the housing (10) terminates in open ends, and the housing has end closures (12,13) which close said open ends to provide a sealed container for the transducer and, in which the housing (10) is filled with an electrically insulating liquid for insulating electrically the inner and outer surfaces (23,24) of the transducer and in which the housing (10) contains a device for balancing the pressure in the electrically insulating liquid with the pressure in the water which surround the projector during operation.

10. A tubular acoustic projector for underwater use, comprising a tubular ceramic piezo-electric transducer (21) having an outer cylindrical surface (24), and means surrounding the outer cylindrical surface of the transducer and compressing radially said transducer, characterized in that said compressing means is provided by a housing (10) including a side wall (11) having a cylindrical inner surface (11A) which contacts said outer cylindrical surface (24) of the transducer (21), said side wall (11) compressing radially said transducer and, in operation, transmitting vibrations of the transducer to surrounding water, and the side wall (11) being so thermally conductive as to dissipate to the surrounding water heat generated by the transducer and in which at least one of the end closures (13) has, near the periphery thereof, a cylindrical groove (20) which is wider in the radial direction then the radial thickness of the side wall (11), and which receives the corresponding end of the side wall.

11. An acoustic projector according to claim 10, in which there is a tight fit between the open end of the side wall (11) and a radially inner cylindrical side of the groove (20).

12. A tubular acoustic projector for underwater use, comprising a tubular ceramic piezo-electric transducer (21) having an outer cylindrical surface (24), and means surrounding the outer cylindrical surface of the transducer and compressing radially said transducer, characterized in that said compressing means is provided by a housing (10) including a side wall (11) having a cylindrical inner surface (11A) which contacts said outer cylindrical surface (24) of the transducer (21), said side wall (11) compressing radially said transducer and, in operation, transmitting vibrations of the transducer to surrounding water, and the side wall (11) being so thermally conductive as to dissipate to the surrounding water heat generated by the transducer and in which one of the end closures (12) is formed integrally with the side wall (11) of the housing.

13. An acoustic projector according to claim 12, in which the side wall (11) is substantially thinner than the end closure (12) to which it is integrally connected.

14. A tubular acoustic projector for underwater use, comprising a tubular ceramic piezo-electric transducer (21) having an outer cylindrical surface (24), and means surrounding the outer cylindrical surface of the transducer and compressing radially said transducer, characterized in that said compressing means is provided by a housing (10) including a side wall (11) having a cylindrical inner surface (11A) which contacts said outer cylindrical surface (24) of the transducer (21), said side wall (11) compressing radially said transducer and, in operation, transmitting vibrations of the transducer to surrounding water, and the side wall (11) being so thermally conductive as to dissipate to the surrounding water heat generated by the transducer and in which the side wall (11) of the housing (10) is of such an axial length as to extend beyond the transducer (21) at both ends thereof.

* * * * *

UNITED STATES PATENT AND TRADEMARK OFFICE
CERTIFICATE OF CORRECTION

PATENT NO. : 4,821,244
DATED : April 11, 1989
INVENTOR(S) : FRANK WOOD

It is certified that error appears in the above-identified patent and that said Letters Patent is hereby corrected as shown below:

Claim 6, line 43, "electric" should read --electrical--.

Signed and Sealed this

Fifth Day of December, 1989

*Attest:*

JEFFREY M. SAMUELS

*Attesting Officer* *Acting Commissioner of Patents and Trademarks*